US006812942B2

(12) United States Patent
Ribak

(10) Patent No.: US 6,812,942 B2
(45) Date of Patent: Nov. 2, 2004

(54) CONTEXT-RESPONSIVE IN-VEHICLE DISPLAY SYSTEM

(75) Inventor: Amnon Ribak, D.N. Galil Tachton (IL)

(73) Assignee: International Business Machines Corporation, Armonk, NY (US)

( * ) Notice: Subject to any disclaimer, the term of this patent is extended or adjusted under 35 U.S.C. 154(b) by 564 days.

(21) Appl. No.: 09/751,323

(22) Filed: Dec. 28, 2000

(65) Prior Publication Data

US 2002/0085043 A1 Jul. 4, 2002

(51) Int. Cl.$^7$ ............................ G09G 5/00; G05D 1/00; G06F 7/00; G01C 21/30
(52) U.S. Cl. ...................... 345/970; 345/705; 345/771; 701/7; 701/36; 701/211
(58) Field of Search ................................. 345/700, 326, 345/334, 705, 970, 771–773, 764, 7; 701/1, 7, 36, 211

(56) References Cited

U.S. PATENT DOCUMENTS

| | | | |
|---|---|---|---|
| 4,162,445 A | | 7/1979 | Campbell |
| 5,121,112 A | * | 6/1992 | Nakadozono .......... 340/870.16 |
| 5,132,666 A | | 7/1992 | Fahs |
| 5,555,502 A | * | 9/1996 | Opel ........................... 701/36 |
| 5,636,145 A | | 6/1997 | Gorman et al. |
| 5,666,102 A | * | 9/1997 | Lahiff ......................... 340/461 |
| 5,691,695 A | * | 11/1997 | Lahiff ......................... 340/461 |
| 5,892,598 A | | 4/1999 | Asakawa et al. |
| 5,974,136 A | | 10/1999 | Murai |
| 6,330,497 B1 | * | 12/2001 | Obradovich et al. .......... 701/1 |

OTHER PUBLICATIONS

Motorola Bluetooth, "Hands –free Car Kit General Information", http://www.motorola.com/bluetooth/products/products_carkit.html., pp. 1–2, Jun. 2000.
The Auto Channel Contacts, "Delphi's Communiport(R): Technology for Tomorrow, Today Demonstrated at Frankfurt Auto Show", Sep. 1999, pp. 1–6.
DELPHI Automotive System Nextech Innovations, "Communiport® Mobile MultiMedia systems", Sep. 2000, pp. 1–2.
Buchholz, K., "Electricity Builds for Convergence 2000", *Automotive Engineering International Online*, http:www.sae.org/automag/convergence/index.html., Sep. 2000, pp. 1–4.
IBM Via Voice for Windows, On–line Product Information, http://www–4.ibm/com/software/speech/desktop/w8–psl.html, pp. 1–5.
Kantowitz, B. et al., "Integration of Driver In–Vehicle its Information", pp. 1–11, May 2000.
Motorola Bluetooth (Bluetooth in Action), "Bluetooth Makes Life Easier . . . ", http://www.mortorola.com/bluetooth/action/action.html, pp. 1–6, Jun. 2000.
Nelson, S., "Drivers' Use of Telecom Devices is Focus of NHTSA Research", *Communications Daily*, vol. 39, No. 20, Feb. 2000, p. 1.
Moskowitz, P., "Delphi and Palm Demonstrate Mobile Multimedia Products and Services", *PR News Wire*, Apr. 18, 2000, pp. 1–3.
Moskowitz, P., "Delphi Communications Technologies Keep Drivers in Touch and At Ease", *PR News Wire*, Jun. 12, 2000, pp. 1–3.
Skrzycki, C., "Driver Distractions Get NHTSA's Attention", *The Washington Post*, Jun. 13, 2000, pp. 1–3.

* cited by examiner

*Primary Examiner*—Kristine Kincaid
*Assistant Examiner*—Nhon D Nguyen
(74) *Attorney, Agent, or Firm*—Darby & Darby

(57) ABSTRACT

A context-responsive display system for use in a vehicle. The display system includes a dashboard display positioned in front of a driver of the vehicle and adapted to display graphic user interface elements in a predetermined graphic composition providing information to the driver regarding operation of devices in the vehicle. The display system also includes a processor coupled to receive signals from the devices in the vehicle and to drive the display responsive thereto, and to alter the graphic composition of the display responsive to a selected input to the processor.

50 Claims, 9 Drawing Sheets

FIG. 7

DRIVER ID SET UP SCREEN

| | |
|---|---|
| DRIVER NAME | CLARA ▽ |
| METHOD OF IDENTIFICATION | VOICE ▽ |
| PREFERRED LANGUAGE | SPANISH ▽ |
| DISPLAY STYLE | CLASSIC ▽ |
| LANGUAGE COLOR | GREEN-LIGHT ▽ |
| BACKGROUND COLOR | BLUE-DARK ▽ |

FIG. 8

DEFAULT DISPLAY SET UP SCREEN FOR DRIVER = CLARA

| | |
|---|---|
| SPEED | SHOW ▽ |
| ENGINE-TEMPERATURE | HIDE ▽ |
| AUDIO EQUIPMENT | SHOW ▽ |
| FUEL LEVEL | SHOW ▽ |
| OIL LEVEL | HIDE ▽ |
| RPM | SHOW ▽ |
| GPS | HIDE ▽ |

FIG. 9

TELEPHONE DISPLAY SET-UP SCREEN
DRIVER – CLARA

| | |
|---|---|
| SHOW TELEPHONE DISPLAY PERMANENTLY | NO ▽ |
| SHOW PHONE DISPLAY FOR INCOMING CALLS | YES ▽ |
| SHOW PHONE DISPLAY FOR OUTGOING CALLS | NO ▽ |
| GENERATE TEXT TO SPEECH MESSAGE | YES ▽ |

| | |
|---|---|
| SPEED | MINIMIZE ▽ |
| ENGINE TEMPERATURE | HIDE ▽ |
| AUDIO EQUIPMENT | MINIMIZE ▽ |
| FUEL LEVEL | HIDE ▽ |
| RPM | HIDE ▽ |
| GPS | MINIMIZE ▽ |

CONTEXT-RESPONSIVE IN-VEHICLE DISPLAY SYSTEM

FIELD OF THE INVENTION

The present invention relates to the field of in-vehicle dashboard displays, particularly displays for driver-control of in-vehicle devices.

BACKGROUND OF THE INVENTION

The number and complexity of driver-controllable in-vehicle devices has grown rapidly in the last several years and is anticipated to further increase in the future. Such devices include audio systems, televisions, telephones, air conditioners, GPS, Internet browsers and other Internet or wireless communication-based systems. A vehicle driver also has control of positioning of vehicular components such as seat, window, roof and mirror positions, many of which can be adjusted by the driver by use of switches located in proximity to the driver. In addition to these accessories, the driver must also control driving functions such as vehicle speed, and engine RPM, which are monitored by responsible drivers. Many functions which are not directly manipulated by the driver, e.g. engine temperature, are displayed on a dashboard and are monitored by the driver and if necessary, the driver chooses actions in response to such displays. While some in-vehicle devices are typically positioned to be controllable or manipulable by a front-seat passenger, all in-vehicle devices are usually designed and positioned to be used by the driver.

Controlling this multiplicity of in-vehicle devices provides a potential safety hazard for the driver himself, and as a consequence, for all the passengers and other road users. Factors that distract the driver's attention from the road and the task of driving are potential safety hazards and should be minimized.

The major factors that reduce the driver's attention to his driving include:

i) devices with a complex interface that require a large amount of user attention to operate. For example, many car phones have a display that identifies the caller. These displays are often small and difficult to read, especially in poor lighting conditions, causing a driver to remove his attention from the road and from the driving for longer periods of time. Other examples of activities that require substantial amounts of driver attention include manually tuning a radio and selecting songs from a CD list of titles.

ii) positioning of the devices in the vehicle in a way that requires the driver to turn his head away from the road, and not merely to glance away from the road. The typical positioning of audio systems and telephones in the mid-point of the dashboard between the driver and the front passenger seat are examples of this sort of dangerous positioning.

iii) a lack of familiarity with the devices. Many different vehicle manufacturers use different interfaces for their in-vehicle systems. Unfamiliarity with the vehicle, such as when driving a new car or a rental car, will increase the length of time it takes the driver to locate and select the intended 'button' or function, and increases the length of time that a driver removes his attention from the road.

iv) increased number of devices. The greater the number of devices controlled by the driver, the longer the amount of time a driver spends not concentrating on driving.

v) devices that distract the driver when in use, i.e. telephone conversations, and devices that as part of their use require the driver to make decisions based upon information provided therefrom, such as GPS.

Skrzycki, in an article entitled "Driver Distractions get NHTSA's Attention", *Washington Post*, Jun. 13, 2000, quotes the US National Highway Traffic Safety Administration Deputy Administrator as saying "anything that distracts the driver from their primary task is something that concerns us, whether it is talking on the phone, eating fast food or getting stock quotes from the Internet".

The use of mobile telephones in vehicles, and approaches to allow them to become more hands-free and thus minimize driver distraction, is described in "Drivers Use of Telecom Devices is Focus of NHTSA Research", *Communications Daily*, 39, 20, Feb. 28, 2000; and in "Motorola Bluetooth Hands Free Car Kit", http://www.motorola.com/bluetooth/products/products_carkit.html.

There is thus a clear need in the art for an improved method and system for controlling the multiplicity of in-vehicle devices which minimizes the distraction to drivers and which thus contributes to road safety.

Kantowitz and Moyer, in an article entitled "Integration of Driver In-vehicle ITS information", http://www.driverdistraction.org/Topics.asp?Track=4&Level=3 &Topic=10&Doc=28#A28, May 31, 2000, incorporated herein by reference, describe approaches for the integration of three categories of in-vehicle information systems: safety and collision avoidance, travel information, and convenience and entertainment. While emphasizing the importance of integrating all in-vehicle information systems to reduce the demands placed on a driver and therefore to increase safety, Kantowitz and Moyer do not propose any particular solution for presenting integrated information to the driver.

The Communiport® Mobile MultiMedia System by Delphi Automotive Systems is a product that controls many in-vehicle systems from a flat bed panel separated from, and in addition to, the traditional dashboard display. Communiport® is described at http://www.delphiauto.com/index.cfm?location=345, and in the following articles: "Delphi and Palm Demonstrate Mobile Multimedia Products and Services", *PR News Wire*, Apr. 18, 2000; "Delphi Communications Technologies Keep Drivers in Touch and at Ease", *PR News Wire*, Jun. 12, 2000; "Delphi's Communiport®: Technology for Tomorrow, Today Demonstrated at Frankfurt Auto Show", http://www.theautochannel.com, Sep. 15, 1999; and "Electricity builds for Convergence 2000" by K. Buchholz, http://www.sae.org/automag/convergence/index.htm.

U.S. Pat. No. 5,892,598 to Asakawa et al. discloses a head up display unit equipped with a transparent and flat image information display screen, suitable for positioning anywhere in the interior of a vehicle. External scene information and simple display information are superimposed upon the screen.

The disclosures of each and every one of the publications mentioned in this section and in other sections of the specification, are incorporated herein by reference, each in its entirety.

SUMMARY OF THE INVENTION

The present invention seeks to provide a new in-vehicle dashboard display that acts as the main interface between the driver and all or most in-vehicle systems. The display is preferably controlled by a central processing unit that manages each of the in-vehicle systems or communicates with the in-vehicle systems, and which controls the communication between the user and the in-vehicle display.

The display system of preferred embodiments of the present invention is context dependent, i.e. the choice of graphic interface elements and/or the size or position of graphic interface elements appearing in the display changes in response to a particular event or situation. This is in contrast to the prior art dashboard displays which always contain the same combination of dials and other indicators, which also do not change their size or position on the dashboard display. The display system typically comprises a default driving display showing a representation of all the major driving functions normally shown on a dashboard display, such as speed, engine RPM (revolutions per minute), and fuel and temperature gauges. In addition, the display typically shows buttons, images or icons relating to other in-vehicle systems such as radio, CD player, telephone, global positioning system (GPS) and air conditioning. Selecting the button for a particular function preferably alters the position or size of components shown on the display, bringing up an image on the display which is related to the usage of that selected function, and the display can be used to control the function. Additionally or alternatively, upon an event not initiated by the driver, such as receipt of an incoming telephone call or email, the display is updated to show an image relating to, and for control of, that specific event. Some of the in-vehicle functions may be deactivated while the vehicle is in motion, typically for safety reasons. Such deactivation is preferably correlated with the removal of the icon of that function from the display.

The display system of preferred embodiments of the present invention also provides for a pointing or other selecting device for operating and manipulating the functions shown on the display without requiring the driver to remove a hand from the steering wheel. The use of such a pointing device increases driving safety during driver interaction with in-vehicle devices. Preferred pointing and selecting devices include, but are not limited to a joystick, clickable buttons on the steering wheel, clickable buttons on the joystick, a thumb button (an enlarged button with a depressed center for control by rotational pressure of the thumb), a track-point device such as that provided in some portable computers, such as the IBM ThinkPad, and pressure-sensitive handgrips on the steering wheel which respond to palm-rotation pressure in different directions. The pressure-sensitive handgrips may optionally be coupled with buttons on the reverse of the grip. It is appreciated that these pointing and selecting devices may be located on the front, side or rear of the steering wheel.

In some preferred embodiments of the present invention, the display system is personally configurable according to driver preferences. The personal configuration may occur based upon learning of driver preferences selected while driving, or driver preferences may be input to the system either in the vehicle or at a location remote from the vehicle. The display system is also able to store the preferences of a number of drivers in a memory, and upon each individual driver being identified to or by the system, the display is adjusted accordingly.

The display system of the present invention reduces the major factors leading to a lack of driver attention to driving described above. The display system is preferably designed to have easily-read displays for controlling in-vehicle devices with a simple, easily-manipulable interface. The display can be designed to clearly indicate the control of devices, in the preferred language of the driver, and optionally in a pictorial form.

In preferred embodiments of the present invention, the display that controls the in-vehicle devices is positioned directly in front of the driver This minimizes or eliminates the need for the driver to turn his head away from the road while manipulating the in-vehicle systems. The driver need only concentrate on controlling one display and not on controlling each individual device.

There is thus provided in accordance with a preferred embodiment of the present invention, a display system for use in a vehicle. The display system includes a dashboard display, positioned in front of a driver of the vehicle, and adapted to display graphic user interface elements, in a predetermined graphic composition, providing information to the driver regarding operation of devices in the vehicle, and a processor, coupled to receive signals from the devices in the vehicle and to drive the display responsive thereto, and to alter the graphic composition of the display responsive to a selected input to the processor.

Further in accordance with a preferred embodiment of the present invention, the processor is adapted to alter the graphic composition of the display by adding a graphic user interface element to the dashboard display, by removing a graphic user interface element from the dashboard display, by changing the position of a graphic user interface element on the dashboard display, or by changing the size of a graphic user interface element on the dashboard display.

Still further in accordance with a preferred embodiment of the present invention, the input to the processor includes a driver input provided by a driver of the vehicle. The driver input may be a vocal input, or selection of an image, icon or button on the dashboard display, or selection of an item from a pull-down menu on the dashboard display. The driver input may include, but is not limited to, a request to initiate a telephone call, a request to change the internal temperature of the vehicle, a request to utilize the GPA, or a request to adjust the audio equipment.

Additionally in accordance with a preferred embodiment of the present invention, the vehicle also includes driver-manipulable steering apparatus, such as a steering wheel or handlebars, and a selecting device mounted thereon, for use by a driver of the vehicle in providing the driver input. The selecting device may be a pointing device such as a joystick, a thumb-button, track-point, and pressure sensitive handgrips. The selecting device may also include clickable buttons located upon the steering apparatus, or the pointing device.

Also in accordance with a preferred embodiment of the present invention, inputting the driver input to the processor does not require the driver removing a hand from the steering apparatus.

Still further in accordance with a preferred embodiment of the present invention, the input to the processor is an input from a gauge of vehicle performance, which may be the speedometer, tachometer, fuel gauge, oil level gauge, tire pressure gauge, engine temperature gauge, brake temperature gauge, or window washer fluid gauge.

Additionally in accordance with a preferred embodiment of the present invention, the input to the processor includes an input from a monitor of the position of vehicle components, which may be the sun roof, windows, seat, internal rear-view mirror, external mirror, steering column, seat belt, and doors.

Also in accordance with a preferred embodiment of the present invention, the input to the processor includes an input from an auxiliary device in the vehicle, which may be audio equipment, air conditioner, Internet browser, television, e-mail terminal, GPS, cellular telephone, travel log, pager and personal digital assistant (PDA).

Further in accordance with a preferred embodiment of the present invention, the input to the processor is generated responsive to an electronic signal from a source external to the vehicle, which may be the receipt of an incoming telephone call, receipt of an e-mail message, and receipt of a traffic alert.

Still further in accordance with a preferred embodiment of the present invention, the dashboard display is personally configured for an individual driver. The display may be personally configured responsive to an input to the processor of driver preferences regarding the graphic composition of the dashboard display, the operation of the dashboard display, or the operation of at least one device in the vehicle. The display may be personally configured at a location remote from the vehicle, or within the vehicle.

Also in accordance with a preferred embodiment of the present invention, driver preferences may be input to the processor, or learned by the processor, while driving.

Additionally in accordance with a preferred embodiment of the present invention, at least one configuration of the graphic composition of the dashboard display is blocked while the vehicle is moving.

There is further provided in accordance with another preferred embodiment of the present invention, a vehicle including a dashboard display and steering apparatus, with a selecting device mounted thereon, for use by a driver of the vehicle in interacting with the display.

Further in accordance with a preferred embodiment of the present invention, the dashboard display is adapted to display graphic user interface elements, in a predetermined graphic composition, providing information to the driver regarding operation of devices in the vehicle, and the vehicle also includes a processor, coupled to receive signals from the devices in the vehicle and to drive the display responsive thereto, and to alter the graphic composition of the display responsive to a selected input to the processor.

There is still further provided in accordance with another preferred embodiment of the present invention, a method for displaying information regarding operation of in-vehicle devices. The method includes receiving signals from the devices, displaying graphic user interface elements in a predetermined graphic composition on a dashboard display positioned in front of a driver of the vehicle, so as to provide information to a driver of the vehicle regarding operation of devices, and modifying the graphic composition of the display responsive to a selected event associated with the vehicle.

Still further in accordance with a preferred embodiment of the present invention, the graphic user interface elements provide information regarding at least one device selected from the group consisting of speedometer, tachometer, audio equipment, air conditioner, Internet browser, television, GPS, sun roof, windows, seat positioning, cellular telephone, fuel gauge, oil level gauge, tire pressure gauge, engine temperature gauge, brake temperature gauge, window-washer fluid gauge, and headlights.

Also in accordance with a preferred embodiment of the present invention, modifying the graphic composition of the display includes adding a graphic user interface element to the dashboard display, removing a graphic user interface element from the dashboard display, changing the position of a graphic user interface element on the dashboard display, and changing the size of a graphic user interface element on the dashboard display.

Still further in accordance with a preferred embodiment of the present invention, the event associated with the vehicle includes a control signal input provided by a driver of the vehicle. The driver input may be a vocal input, or selection of an image, icon or button on the dashboard display, or selection of an item from a pull-down menu on the dashboard display.

Further in accordance with a preferred embodiment of the present invention, inputting the control signal includes manipulating a selecting device mounted upon steering apparatus of the vehicle, such as a steering wheel or handlebars. The selecting device may be a pointing device such as a joystick, a thumb-button, track-point, and pressure sensitive hand-grips. The selecting device may also include clickable buttons located upon the steering apparatus, or the pointing device. Inputting the control signal preferably does not require the driver removing a hand from the steering apparatus.

Additionally in accordance with a preferred embodiment of the present invention, the control signal includes a request to initiate a telephone call, a request to change the internal temperature of the vehicle, a request to utilize the GPA, or a request to adjust the audio equipment.

Still further in accordance with a preferred embodiment of the present invention, the event associated with the vehicle is an input from a gauge of vehicle performance, which may be the speedometer, tachometer, fuel gauge, oil level gauge, tire pressure gauge, engine temperature gauge, brake temperature gauge, or window washer fluid gauge.

Additionally in accordance with a preferred embodiment of the present invention, the event associated with the vehicle includes an input from a monitor of the position of vehicle components, which may be the sun roof, windows, seat, internal rear-view mirror, external mirror, steering column, seat belt, and doors.

Also in accordance with a preferred embodiment of the present invention, the event associated with the vehicle includes an input from an auxiliary device in the vehicle, which may be audio equipment, air conditioner, Internet browser, television, e-mail terminal, GPS, cellular telephone, travel log, pager and personal digital assistant (PDA).

Further in accordance with a preferred embodiment of the present invention, the event associated with the vehicle is generated responsive to an electronic signal from a source external to the vehicle, which may be the receipt of an incoming telephone call, receipt of an e-mail message, and receipt of a traffic alert.

Still further in accordance with a preferred embodiment of the present invention, modifying the graphic configuration comprises blocking some configurations of the graphic composition of the dashboard display while the vehicle is moving.

There is also provided in accordance with another preferred embodiment of the present invention, a method for controlling a dashboard display of a vehicle, which method includes manipulating a pointing device located upon the steering apparatus of the vehicle. The pointing device may be a joystick, a thumb-button, track-point, and pressure sensitive hand-grips. The steering apparatus may also include clickable buttons.

Still further in accordance with a preferred embodiment of the present invention, the method also includes receiving signals from in-vehicle devices, displaying graphic user interface elements in a predetermined graphic composition on the dashboard display so as to provide information to a driver of the vehicle regarding operation of at least one of the in-vehicle devices and modifying the graphic composition of the dashboard display responsive to the manipulation of the pointing device.

BRIEF DESCRIPTION OF THE DRAWINGS

The present invention will be understood and appreciated more fully from the following detailed description, taken in conjunction with the drawings in which:

FIG. 7 is a simplified illustration of a set-up screen allowing input of user preferences for the in-vehicle display and control system of FIG. 2;

FIG. 8 is a simplified illustration of another set-up screen allowing input of user preferences for the in-vehicle display and control system of FIG. 2; and FIG. 9 is a simplified illustration of another set-up screen allowing input of user preferences for the in-vehicle display and control system of FIG. 2.

DETAILED DESCRIPTION OF PREFERRED EMBODIMENTS

Figure 1:
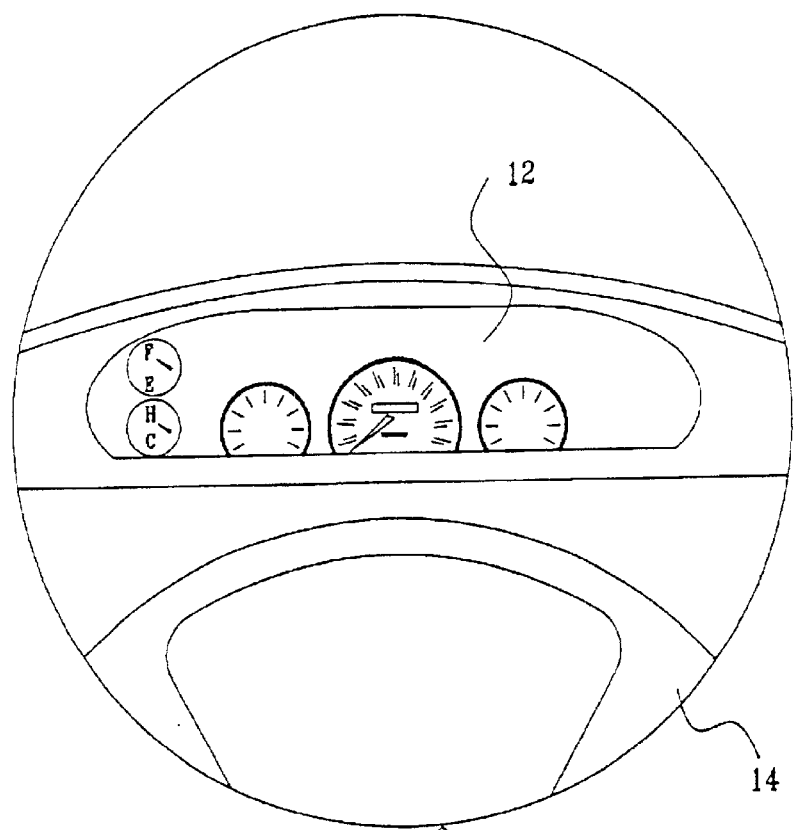
FIG. 1 is a schematic illustration of the interior of a vehicle with a typical prior art dashboard display.
Figure 1:
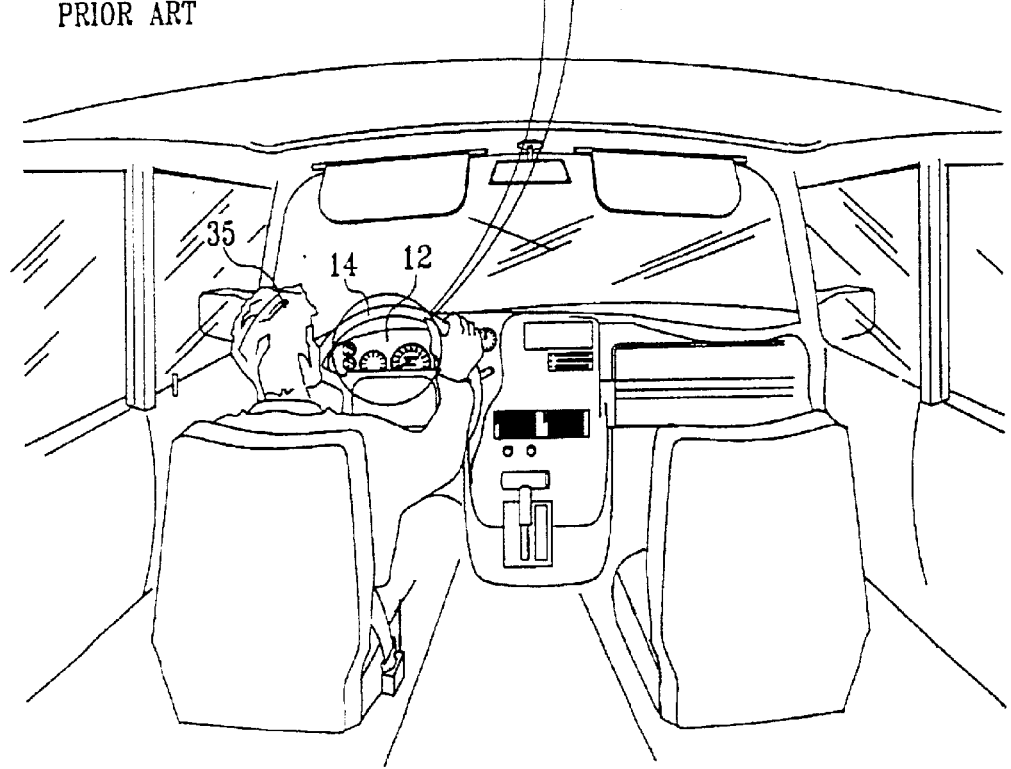

Shown in FIG. 1 is a schematic illustration of the interior of a vehicle showing a prior art dashboard display 12 and steering wheel 14, operated by a driver 35.

Figure 2A:
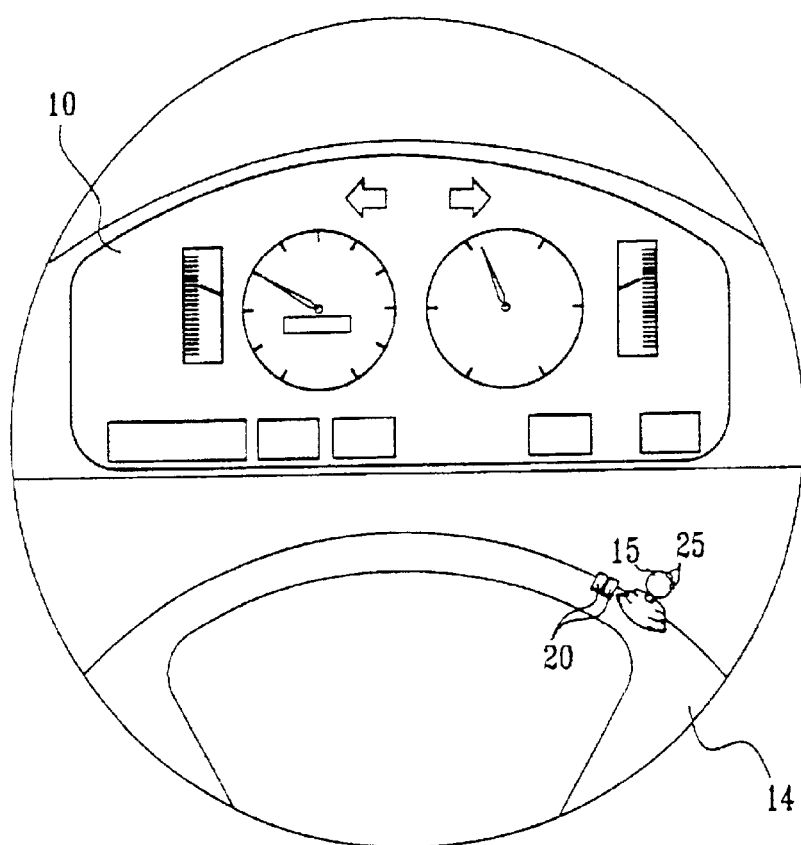
FIG. 2A is a schematic illustration of the interior of a vehicle with an in-vehicle display and control system, constructed and operative in accordance with a preferred embodiment of the present invention.

Reference is now made to FIG. 2A, which illustrates schematically the interior of a vehicle with an in-vehicle display 10 and associated control system, constructed and operative in accordance with a preferred embodiment of the present invention. In this preferred embodiment, controls for use with display 10 are mounted upon steering wheel 14. Typical controls include, but are not limited to, a joystick 15 and clickable buttons 20. In an additional or alternative embodiment, there may be buttons 25 as part of joystick 15, analogous to those on a typical mouse used for controlling a computer screen. In one embodiment, a combination of joystick 15 and clicks of buttons 20, 25 are used to manipulate the functions of display 10. Optionally the manipulation can involve moving a cursor on the vehicle display 10. It is appreciated that methods and apparatus for creating and controlling a graphical user interface, and selecting functions thereon are well known in the art, and can be used as appropriate.

Preferably joystick 15 is of a small enough size and designed to be operated by 1-3 fingers while the rest of the hand is not removed from the steering wheel, and thus control over the vehicle by the driver is retained. Although for the sake of clarity, the joystick appears in FIG. 2 on the top of the steering wheel, in actual operation, for safety reasons, the joystick may be located on the reverse side of the steering wheel, away from the driver. Removal of the fingers from joystick 15 to grip wheel 14 is preferably rapid as and when required.

Figure 2A:
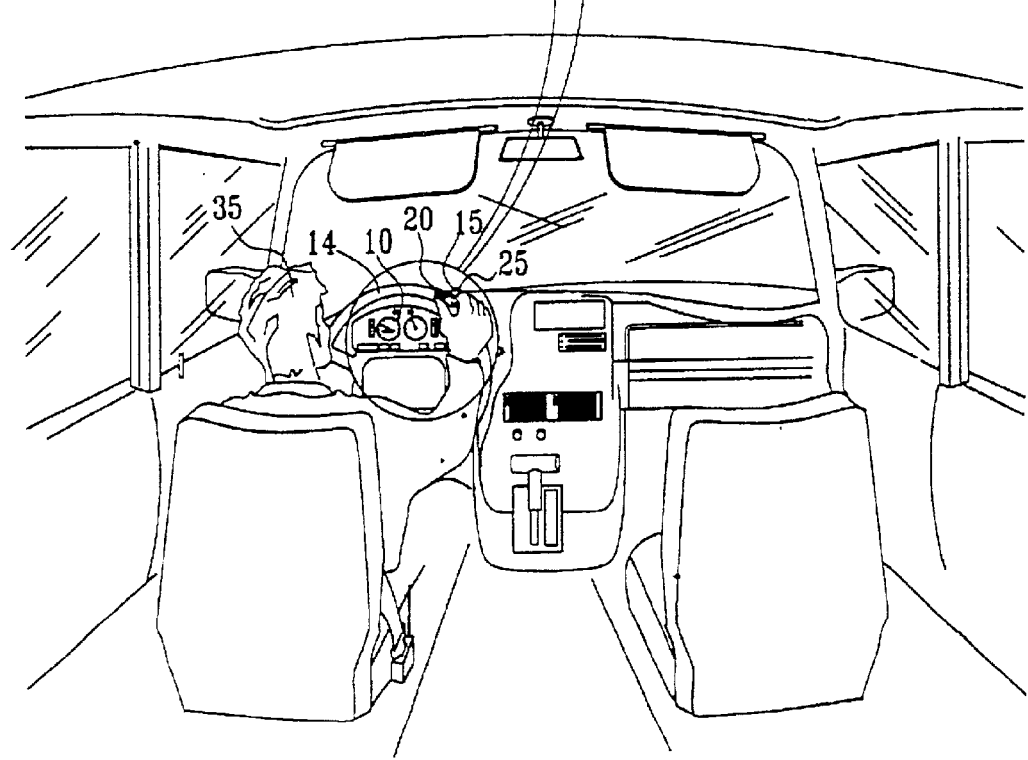
Figure 2B:
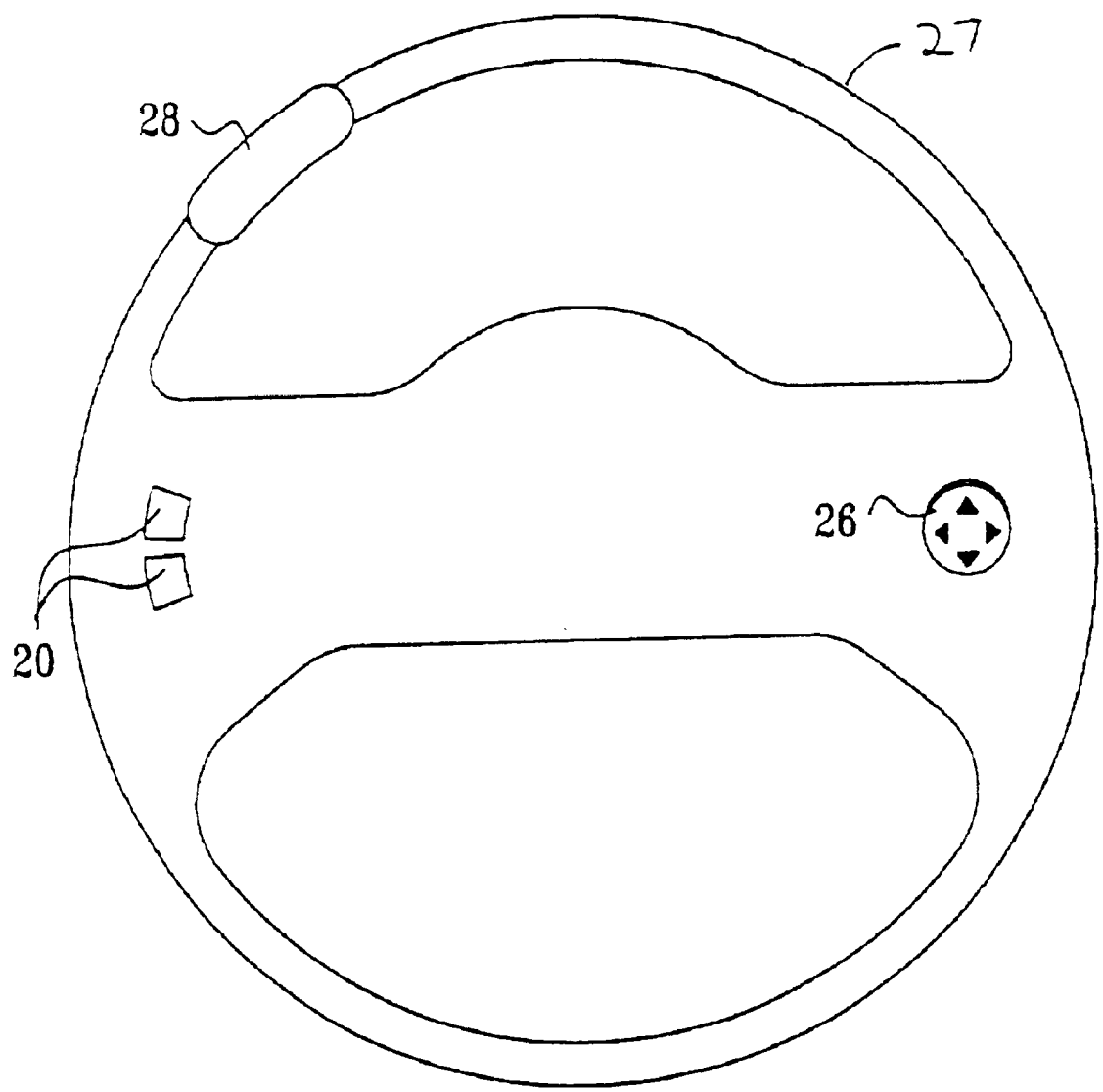
FIG. 2B is a schematic illustration of a steering wheel for use in a vehicle with an in-vehicle display and control system, constructed and operative in accordance with a preferred embodiment of the present invention.

Reference is now made to FIG. 2B which is a schematic illustration of a steering wheel 27 for use in a vehicle with an in-vehicle display and control system, constructed and operative in accordance with a preferred embodiment of the present invention. Steering wheel 27 may be used in place of steering wheel 14 in the system shown in FIG. 2A, and the controls shown on steering wheel 27 may be used in place of those on steering wheel 14. Located upon steering wheel 27 are clickable buttons 20, a thumb button 26 and a pressure-sensitive handgrip 28. These are further examples of pointing and selecting devices for controlling display 10. Thumb button 26 is preferably an enlarged button with a depressed center and two-axis movement, for control by rotational pressure of the thumb. Handgrip 28 preferably responds to palm-rotation pressure in different directions. Both button 26 and handgrip 28 offer safe, ergonomic alternatives to conventional pointing devices, such as joystick 14.

Additionally or alternatively, display 10 can be controlled by voice activation. Voice activation systems are well known in the art. An example of such a system is ViaVoice, produced by IBM Corporation (http://www-4.ibm.com/software.speech).

Figure 3:
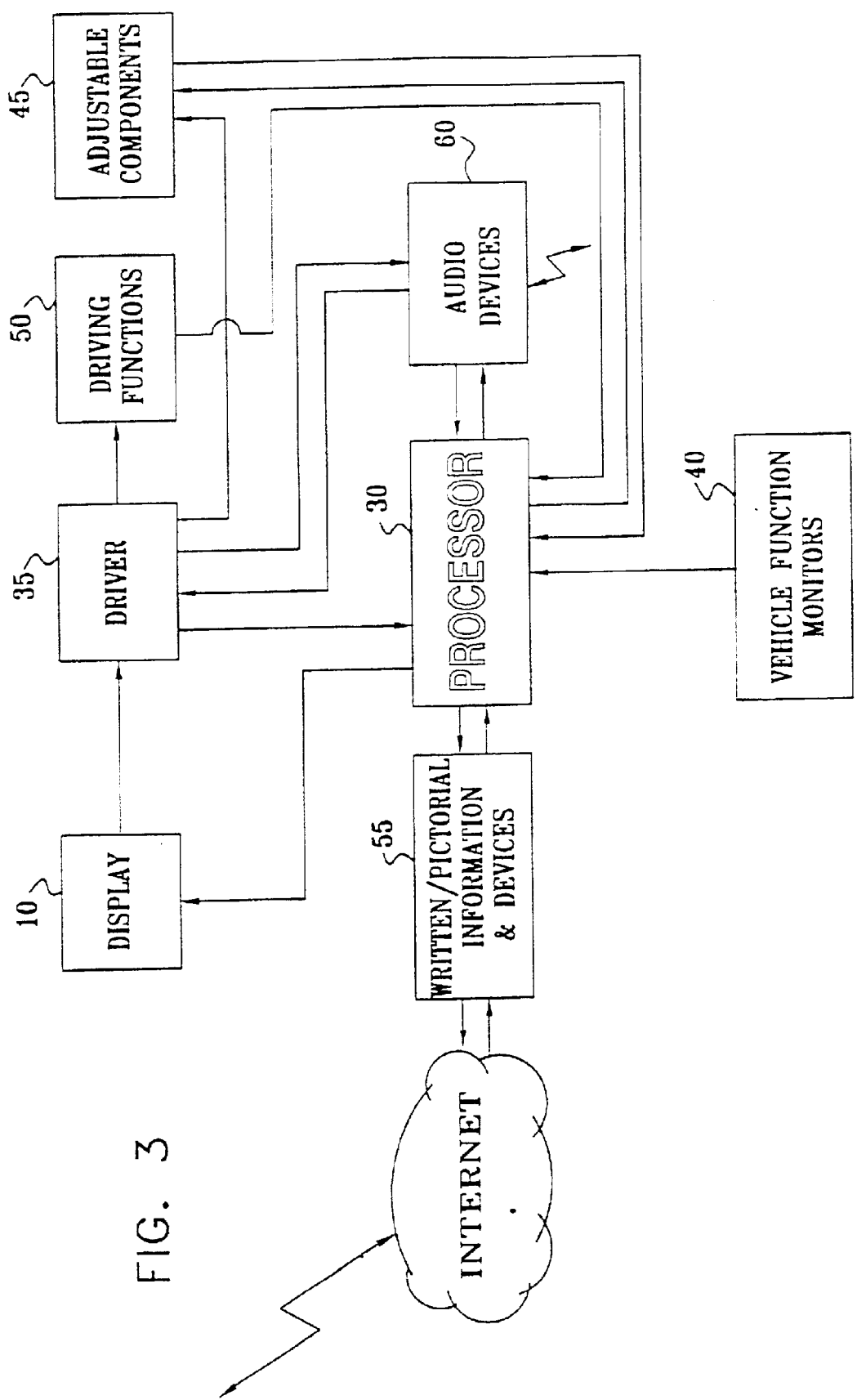
FIG. 3 is a simplified block diagram illustrating data flow between components of the in-vehicle display and control system of FIG. 2.

Reference is now made to FIG. 3 which is a simplified block diagram illustrating data flow between components of an in-vehicle display and control system constructed and operative in accordance with a preferred embodiment of the present invention. Shown is a processor 30 providing information to display 10, said display being updated in response to the instructions from the processor 30. Driver 35 typically sees the information displayed on the screen and acts accordingly. In response to the information displayed on display 10, the driver typically uses joystick 15 or buttons 20, 25 to provide information back to processor 30, which then updates display 10 correspondingly. The display is thus interactive in that the driver responds to information relayed through display 10, which is then updated in response to the driver action.

It is appreciated that methods and apparatus for controlling disparate devices such as cellular phones, audio systems and temperature control from a central control unit are well known in the art, and can be integrated as appropriate into display and control systems in accordance with preferred embodiments of the present invention. In one preferred embodiment, processor 30 is connected to the in-vehicle systems via an internationally accepted communication protocol such as described in U.S. Pat. No. 5,974,136 to Murai, or a communication protocol such as Bluetooth, http://www.motorola.com/bluetooth/action/action.html.

Processor 30 is preferably able to monitor and to display various vehicle functions that typically do not require direct control by driver 35, by means of vehicle function monitors 40. Such monitored and displayed parameters typically include engine temperature, fuel level, oil level, window-washer fluid level, distance traveled, tire pressure, and vehicle weight. Gauges, sensors and monitors as are known in the art, can be used to monitor these functions, and to transmit the data to processor 30 for display 10. In a preferred embodiment of the present invention, only the engine temperature, fuel level and distance traveled are displayed as a default upon display 10, and other monitored parameters are typically only displayed upon request.

In a preferred embodiment, vehicle-function monitors 40 may be displayed continuously as a default on the display until the driver requests the display of a different function, e.g. control of the CD player. At that time, the display of these parameters may be minimized on the display, moved to a different position on the display, or removed from it entirely. After the driver has completed his interaction with the display relating to the other function, e.g. he has selected the required tracks on the CD, the display of the parameters typically returns to its default setting.

In an alternative embodiment, vehicle-function monitors 40 may not be displayed during default display, but are only shown when specifically requested by the driver, or if any of these gauges or monitors reaches a level that is deemed worthy of attention by the driver. Such a display would be invoked, for example, if the engine oil levels or the engine temperature reaching a predetermined level.

Processor 30 is preferably also able to monitor the positions and settings of various adjustable vehicular components 45. In a preferred embodiment of the present Invention, the display provides an adjustment interface for controlling the position and settings of adjustable components 45. Such an interface may comprise selectable arrows on display 10 for moving the component up, down, right, left, open or closed as appropriate. In an alternative or additional embodiment, the position of the components may also be shown on the display 10. Such adjustable components 45 typically include the driver's seat, the interior rear view mirror, the exterior side view mirrors, the driving column and steering wheel 14, windows and roof, internal temperature and headlight height. Other adjustable components include the volume or settings of the in-vehicle audio systems, as noted below, and the like.

Manipulating the settings or positions of vehicular components 45 may be performed manually by driver 35. Alternatively or additionally, manipulating the settings or positions of vehicular components 45 may be performed in response to the driver's instructions inputted via joystick 15 or buttons 20, 25. During driving, however, some adjustments, such as adjustments to external mirrors, are preferably not performed manually by the driver as this would reduce the level of concentration on the driving, and therefore they are preferably adjusted automatically in response to the driver's instructions.

The positions of components 45 can be manipulated by any method known in the art. The positions are monitored, as appropriate, and the data transferred to processor 30 for display 10 if desired. Typically, the position of adjustable components of the vehicle are not shown on the default display, but are only shown when specifically requested by driver 35, or if any of components moves unexpectedly and as such is brought to the attention of the driver. Such a circumstance may include a rear door being opened, or the position of a side view mirror being changed after contact with another object.

Preferably, irrespective of the additional data that may be displayed by the processor, critical driving functions 50, such as the speed of the vehicle, are always shown on display 10. The speedometer may be any standard speedometer, or may be a programmable multi-function speedometer as described in U.S. Pat. No. 5,636,145 to Gorman et al., or a digital speedometer as described in U.S. Pat. No. 4,162,445 to Campbell. Details of the vehicle speed are transferred to processor 30, and to display 10. Typically the speed of the vehicle is always shown on the display, and when the driver selects another function for the display the speedometer is maintained on the screen but is reduced in size. In an optional embodiment, the speed of the vehicle is not shown on the display while stationary.

As shown in FIG. 3, display 10 may also show written or pictorial information 55 received from in-vehicle devices such as television, GPS and other Internet derived information. Display 10 may also show written, tabulated or pictorial information while using the display as a personal digital assistant with functions such as a meetings calendar, dictionary, thesaurus or calculator. Display 10, together with processor 30, can also be used to log travel information, such as time and distance traveled, and amount of fuel consumed, acting as a travel log for trucks and commercial transportation. Display 10 may also be used as an e-mail terminal to read and send e-mail. Optionally, driver 35 may request that e-mail be read aloud using conventional text-to-speech conversion technology.

Additionally or alternatively, display 10 may also display information relevant to audio devices 60, such as audio equipment, television, radio transmitted information, and communication devices such as a cellular telephone, pager or Personal Digital Assistant (PDA). Such relevant images shown on display 10 may include the name of a caller to a cellular telephone, duration of call via cellular telephone, name and frequency of a radio station, music video, play list of a musical recording device such as a compact disk, mini disk or MP3 player.

Typically, the items of information shown upon display are set according to at least the following two criteria: safety and driver preference. Typically, safety factors override the driver's preference. Some items of information may be considered to be so important to the driving, or may be mandated by legal requirements, that they are always present on the display during driving. Such information may include the speed, fuel level and distance to the nearest vehicle in front. Icons, named buttons or pull down menus relating to other functions are preferably also present on the display to allow the driver to select other functions as required. Methods for so doing are well known in the art.

Some items which may be shown upon display 10 may be considered too distracting to the driver and may be only displayed while the vehicle is stationary or even when the engine is switched off. Such facilities may include using display 10 as an Internet browser, as an e-mail terminal or as a television. Typically, the icon, button or menu allowing the selection of such a forbidden function is hidden until the vehicle is stopped.

Preferably the display is customized according to driver preference as is described in detail hereinbelow.

Figure 4:
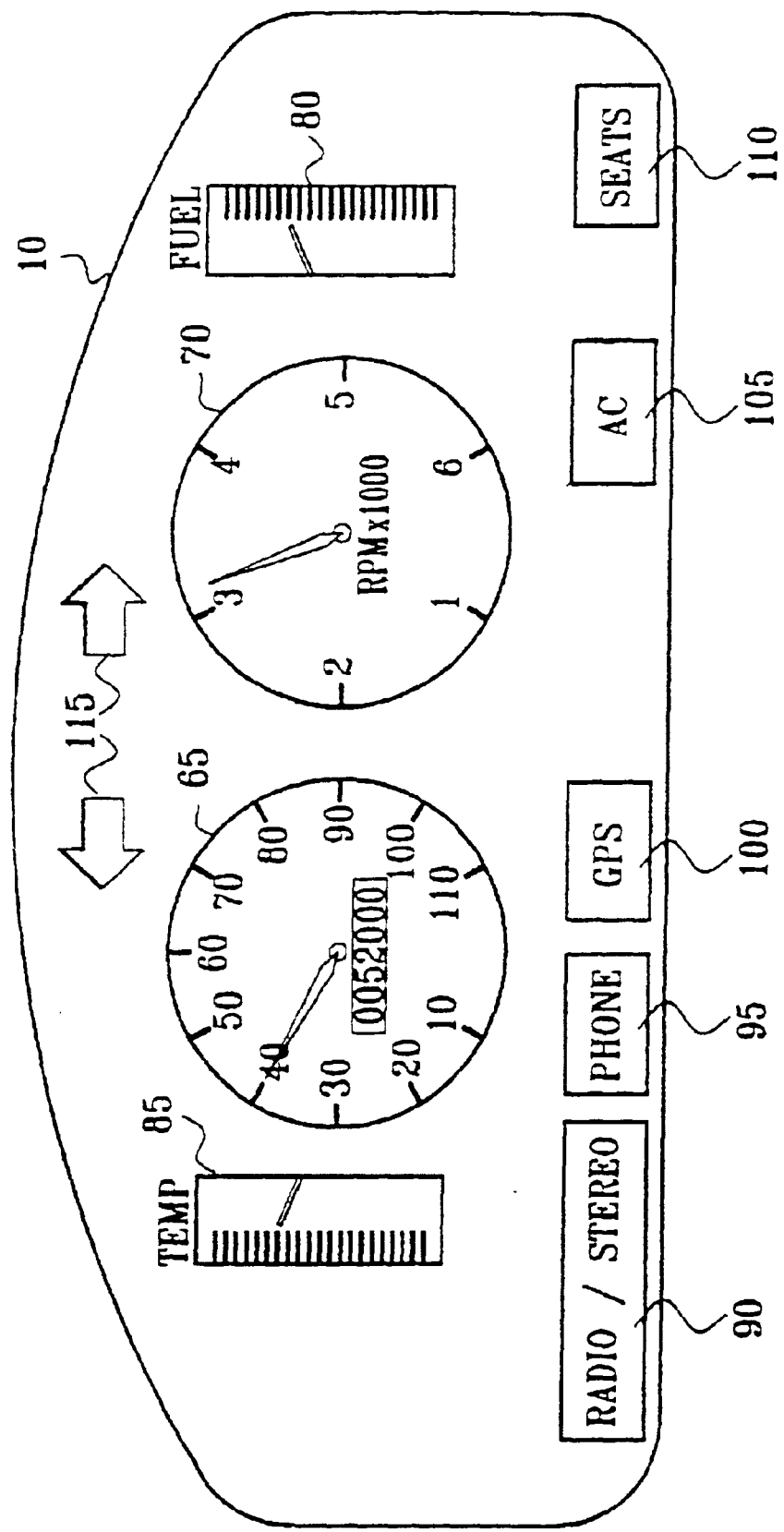
FIG. 4 is a simplified illustration of a display used in the in-vehicle display and control system of FIG. 2 in a default configuration.

Reference is now made to FIG. 4 which is a simplified illustration of display 10 of the in-vehicle display and control system of FIG. 2. In the embodiment shown in FIG. 4, the display is a 'default' display, showing the information provided to a driver while the vehicle is being driven normally. Such information includes, but is not limited to, vehicle speed 65, and engine RPM 70, distance traveled 75, turn signal indicators 115, and a fuel gauge 80 and heat gauge 85. A number of selectable buttons for controlling other in-vehicle systems, such as radio/stereo 90, phone 95, GPS 100, air conditioning (AC) 105 and seat position 110, are also shown on display 10.

Upon the occurrence of a driver initiated event, such as the driver's selection of a button for a particular function such as GPS 100, or an externally initiated event such as receipt of an incoming phone call, receipt of an e-mail, receipt of a traffic control alert, etc, the interface of display 10 is preferably changed to an interface that is more suited for dealing with that specific situation.

Figure 5:
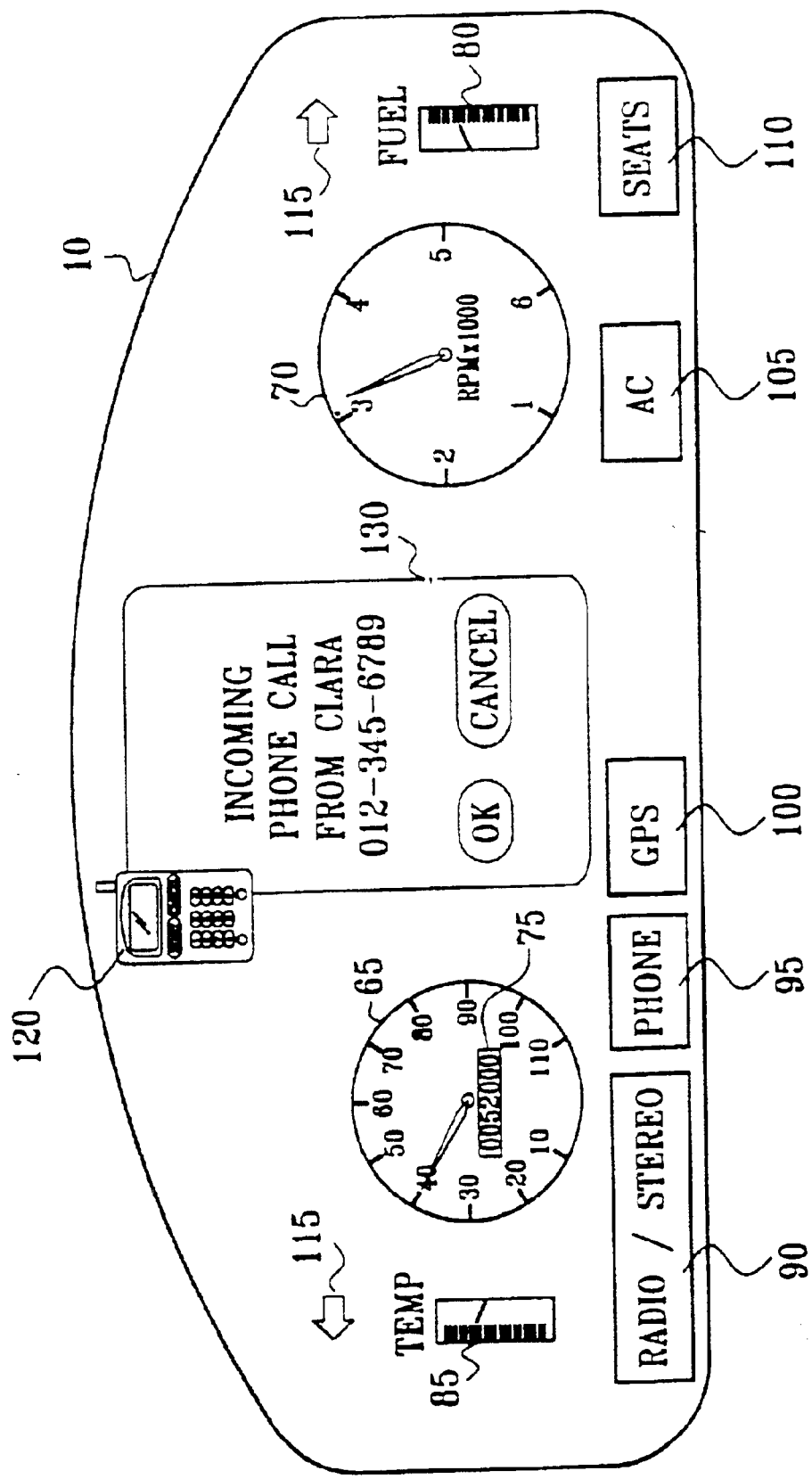
FIG. 5 is a simplified illustration of the display of FIG. 4 in an alternative configuration invoked upon receipt of an incoming telephone call.

Reference is now made to FIG. 5 which is a simplified illustration of in-vehicle display 10 responding to an incoming phone call. As shown in FIG. 5, upon receipt of an incoming phone call from Clara, display 10 is adjusted to show an icon 120 of a mobile phone and dialog box 130 with a message that there is an incoming phone call from Clara, and her phone number is shown. Preferably, the text "Incoming phone call from Clara" is also spoken to the driver, which may increase safety by reducing driver distraction. As shown, speedometer 65 and RPM meter 70 are minimized, and indicators 115 are moved to allow space for phone icon 120 and dialog box 130, while other buttons 90, 95, 100, 105 and 110 on display 10 remain in place. Alternatively or additionally, buttons could be deleted from the screen to allow the phone function to continue. Shown on the telephone dialog box 130 are two buttons: "OK" and "cancel". Selecting the OK button allows the incoming phone call to continue, while pressing the cancel button would break the phone connection. Alternatively, the driver may give a voice command to begin or reject the telephone conversation.

Figure 6:
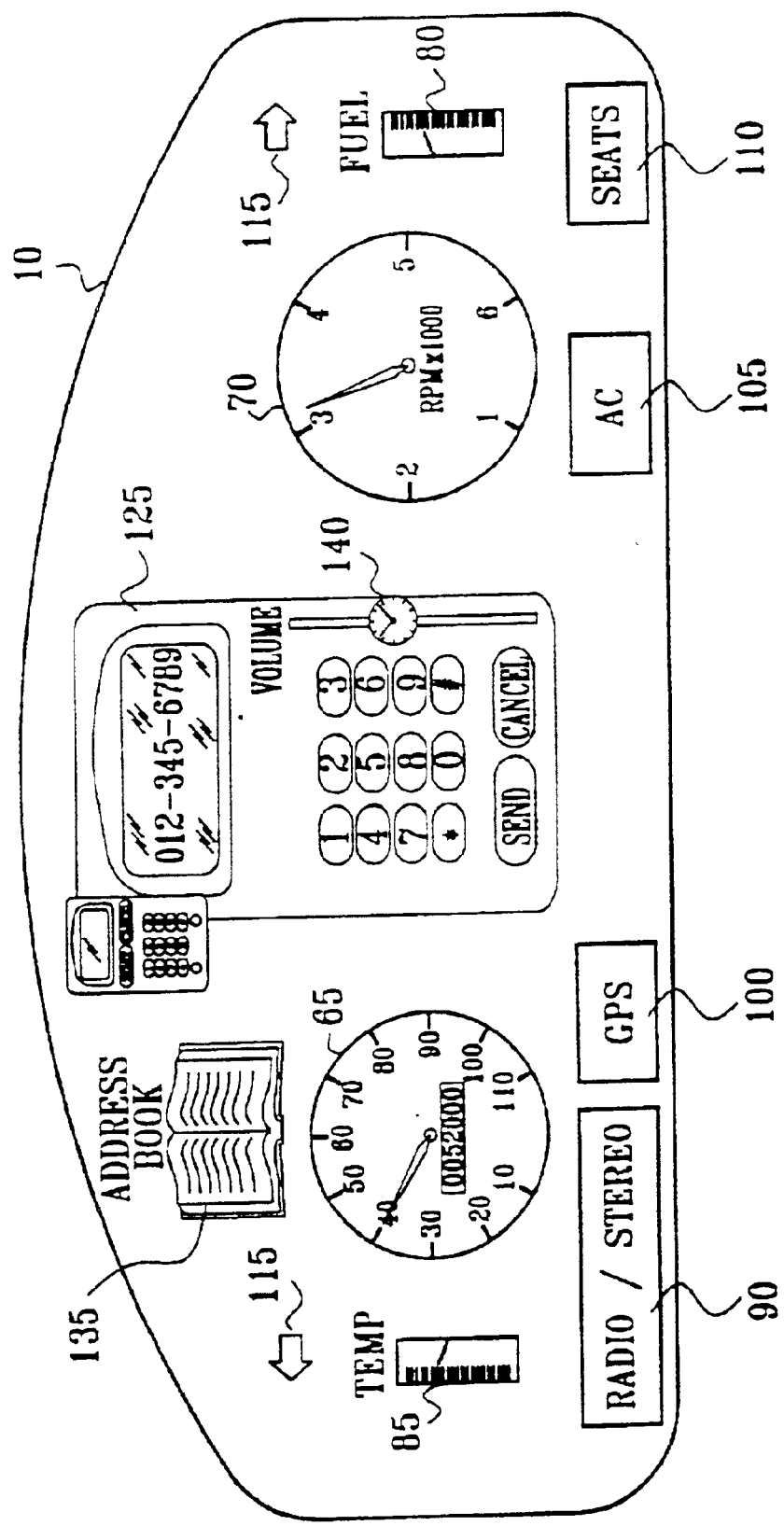
FIG. 6 is a simplified illustration of the display of FIG. 4 in a further alternative configuration invoked when a driver selects to make an outgoing telephone call.

Reference is now made to FIG. 6 which is a simplified illustration of display 10 after the driver has selected the telephone function in order to make an outgoing call, typically by clicking on the telephone icon or button 95, or by voice activation. As shown in FIG. 6, display 10 is adjusted to show an icon 125 of a mobile phone, a timer 140, and an address book 135. The display preferably acts as a fully functional cellular-phone interface, controlled by the driver either via spoken commands, or via joystick 15 and/or buttons 20, 25 to transmit control commands to the telephone display. Optionally as shown in FIG. 6, once a function button, such as telephone button 95, has been selected, it is removed from display 10, while the telephone functionality is being utilized.

Preferably display 10 changes its interface and the components shown upon it according to the situation, in an analogous way to windows opening on a typical computer display.

The in-vehicle display and control system as described herein preferably can be personalized for a multiplicity of drivers, storing in a memory personal preferences and settings with respect to each specific driver, or even to have multiple different, selectable "looks" for use by a single driver. The settings and preferences of a specific driver are preferably recalled in response to a driver's selection. Typically upon entering the vehicle and sitting upon the driver's seat, the driver will switch on the ignition of the vehicle, which causes display 10 to be activated. At the same time, the driver preferably identifies himself to the system by inputting his name to the display system, typically by speaking or by selecting from a list on display 10. Once an individual driver has been identified, the graphic interface of display 10 preferably corresponds to the specific driver's previously defined preferences, or a specified one of an individual driver's multiple stored preferences.

The appearance of the display, as well as settings for the in-vehicle components controlled via the display system may be set according to the specific driver's preferences. Preferably, an individual driver's preferences are stored in a memory of processor 30. For example the user may input preferences of mirror and seat position, and upon recognition of the specific driver, the system adjusts the mirror and seat position accordingly. The features of the display that can be designated on a set up screen include preferred interface language, display UI 'moods' or 'skin-styles' such as wooden, classic, metal, futuristic, etc., background color, feature color, etc. A user may also input preferences whether or not to show or hide on display 10 devices such as RPM meter, or monitored functions such as engine temperature., etc. Display 10 may also show a list of radio stations, showing their names and frequencies. The user may choose to group the stations according to categories, such as news, jazz, classic, rock, etc, and the user may input a selection of personal favorite stations. Display 10 is typically able to show song lists from compact disks and the like, to store details of a user selected 'play list', and to play back the selected list of songs. A history of previous 'play lists' is typically stored in a memory of processor 30.

Preferably all details of driver preferences of display and settings of in-vehicle functions may be input to the system. This input may be made directly via set-up screens on display 10, as described below with reference to FIGS. 7–9, or via other methods such as input from a PDA, or an MP3 player, by an infrared link, for example. Alternatively or additionally, details of driver preferences may be input to processor 30 by inserting a data-storage device into a data-input portal in the display system and retrieving therefrom previously stored data. Typical data-storage devices include, but are not limited to a diskette, a smart card, a memory stick and a microdrive. One preferred method for input of driver preferences into the data-storage device is via set-up screens on a general-purpose computer, for example as described below with reference to FIGS. 7–9.

In a preferred embodiment, such details may be input on a computing device such as a home computer, and transmitted through a data network such as the Internet to in-vehicle processor 30. Alternatively or additionally, such details may be introduced directly to processor 30 via a set up screen on display 10. In a preferred embodiment, details of all authorized drivers for the vehicle, and of their preferences, are inputted into the memory of processor at the dealership at the time the vehicle is purchased.

Reference is now made to FIGS. 7–9 which are simplified illustrations of input screens allowing input of driver preferences to permanent storage in memory, typically to the memory of processor 30, or to another data-storage device, as mentioned above.

Shown in FIG. 7 is a simplified illustration of a set-up screen allowing input of user preferences for the settings and appearance of the in-vehicle display of FIG. 4. As shown the driver's name may be input, as well as methods of identification for that driver, preferred language of communication, and details of the preferred color and style of the display.

Shown in FIG. 8 is another simplified illustration of a set-up screen allowing input of user preferences for the settings and appearance of the in-vehicle display of FIG. 4. Shown are options whether to show or hide on the display representations of functions such as speed, engine temperature, audio equipment, fuel level, oil level, RPM and GPS.

Shown in FIG. 9 is a simplified illustration of a set-up screen allowing input of user preferences for the settings and appearance of the in-vehicle display of FIG. 4. As shown the driver Clara has the options of whether or not to enable a permanent telephone display, and whether or not to allow telephone function displays, such as FIGS. 5 and 6, during incoming or outgoing telephone calls. The driver Clara has further options of whether or not to hide or minimize other items on the display when the telephone display, such as FIGS. 5 and 6, is operative. Preferably, the set-up options also offer the possibility of generating text-to-speech messages that announce the name or number of the calling party when an incoming telephone call is received.

If no driver is recognized by the system, a default selection of settings may be employed, typically as defined by the manufacturer, and in adherence to national and international standards. Personal preferences may be updated during driving based upon changes to the default settings. If the driver is not recognized, the user will typically be prompted for a identifying name so that the preferences can be stored in the memory.

It is appreciated that preferred embodiments of the display and control mechanism of the present invention have been described herein with relation to automobiles. As used herein, the term vehicle also includes, but is not limited to, land transportation vehicles such as cars, vans, trucks, lorries, buses, jeeps, motorcycles, bulldozers, juggernauts and ambulances, as well as other surface vehicles. It is appreciated that some vehicles, such as motor cycles, are not steered by steering wheels, but by movement of other types of steering apparatus such as handlebars. Accordingly, selecting or pointing devices such as a joystick or buttons for controlling the display would be located upon the particular steering apparatus for that vehicle.

It is appreciated that certain features of the invention, which are, for clarity, described in the context of separate embodiments, may also be provided in the context of a single embodiment. Conversely, various features of the invention which are, for brevity, described in the context of a single embodiment, may also be provided separately or in any suitable subcombination.

It will be appreciated by persons skilled in the art that the present invention is not limited by what has been particularly shown and described hereinabove. Rather the scope of the present invention includes both combinations and subcombinations of various features described hereinabove as well as variations and modifications thereto which would occur to a person of skill in the art upon reading the above description and which are not in the prior art.

What is claimed is:

1. A display system for use in a vehicle, comprising:
   a dashboard display, positioned in front of a driver of the vehicle, and adapted to display graphic user interface elements, in a predetermined graphic composition, providing information to the driver regarding operation of devices in the vehicle; and
   a processor, coupled to receive signals from the devices in the vehicle and to drive the display responsive thereto, and to alter the graphic composition of the display responsive to a selected input to the processor,
   wherein at least one configuration of the graphic composition of the dashboard display is blocked while the vehicle is moving.

2. A display system according to claim 1 wherein said graphic user interface elements provide information regarding at least one device selected from the group consisting of speedometer, tachometer, audio equipment, air conditioner, Internet browser, television, GPS, sun roof, windows, seat positioning, cellular telephone, fuel gauge, oil level gauge, tire pressure gauge, engine temperature gauge, brake temperature gauge, window-washer fluid gauge, and headlights.

3. A display system according to claim 1 wherein the processor is adapted to alter the graphic composition of the display by adding one of the graphic user interface elements to the dashboard display.

4. A display system according to claim 1 wherein the processor is adapted to alter the graphic composition of the display by removing one of the graphic user interface elements from the dashboard display.

5. A display system according to claim 1 wherein the processor is adapted to alter the graphic composition of the display by changing the position of one of the graphic user interface elements on the dashboard display.

6. A display system according to claim 1 wherein the processor is adapted to alter the graphic composition of the display by changing the size of one of the graphic user interface elements on the dashboard display.

7. A display system according to claim 1 wherein the processor is further adapted to alter the graphic composition of the display responsive to a driver input provided by a driver of the vehicle.

8. A display system according to claim 7 wherein said driver input comprises a vocal input.

9. A display system according to claim 7 wherein said driver input comprises selection of an image, icon or button on the dashboard display, or selection of an item from a pull-down menu on the dashboard display.

10. A display system according to claim 7 wherein said vehicle also comprises driver-manipulable steering apparatus, said display system further comprising a selecting device mounted upon said steering apparatus, for use by a driver of the vehicle in providing said driver input.

11. A display system according to claim 10 wherein said selecting device comprises a pointing device.

12. A display system according to claim 11 wherein said pointing device is selected from the group consisting of a joystick, a thumb-button, track-point, and pressure sensitive hand-grips.

13. A display system according to claim 11 wherein said selecting device also comprises clickable buttons located upon said steering apparatus.

14. A display system according to claim 11 wherein said selecting device also comprises clickable buttons located upon said pointing device.

15. A display system according to claim 10 wherein said steering apparatus comprises a steering wheel.

16. A display system according to claim 10 wherein said steering apparatus comprises handlebars.

17. A display system according to claim 10 wherein inputting said driver input to said processor does not require the driver removing a hand from the steering apparatus.

18. A display system according to claim 7 wherein said driver input is selected from the group consisting of a request to initiate a telephone call, a request to change the internal temperature of the vehicle, a request to utilize the GPA, and a request to adjust the audio equipment.

19. A display system according to claim 1 wherein said dashboard display is personally configured for an individual driver.

20. A display system according to claim 19 wherein said display is personally configured responsive to an input to the processor of driver preferences regarding the graphic composition of the dashboard display.

21. A display system according to claim 19 wherein said display is personally configured responsive to an input to the processor of driver preferences relating to operation of the dashboard display.

22. A display system according to claim 19 wherein said display is personally configured responsive to an input to the processor of driver preferences relating to operation of at least one device in the vehicle.

23. A display system according to claim 19 wherein said display is personally configured responsive to an input of driver preferences to the processor at a location remote from the vehicle.

24. A display system according to claim 19 wherein said display is personally configured responsive to an input of driver preferences to the processor within the vehicle.

25. A display system according to claim 24 wherein said input of driver preferences comprises an input to the processor while the vehicle is driving.

26. A display system for use in a vehicle, comprising:
a dashboard display, positioned in front of a driver of the vehicle, and adapted to display graphic user interface elements, in a predetermined graphic composition, providing information to the driver regarding operation of devices in the vehicle; and
a processor, coupled to receive signals from the devices in the vehicle and to drive the display responsive thereto, and to alter the graphic composition of the display responsive to a selected input to the processor,
wherein said dashboard display is personally configured for an individual driver, and
wherein said display is personally configured responsive to an input of driver preferences to the processor within the vehicle, and
wherein said input of driver preferences comprises driver preferences learned by the processor while the vehicle is driving.

27. A method for displaying information regarding operation of in-vehicle devices, comprising:
receiving signals from the devices;
displaying graphic user interface elements in a predetermined graphic composition on a dashboard display positioned in front of a driver of the vehicle, so as to provide information to a driver of the vehicle regarding operation of devices; and
modifying the graphic composition of the display responsive to a selected event associated with the vehicle,
wherein modifying the graphic configuration comprises blocking some configurations of the graphic composition of the dashboard display while the vehicle is moving.

28. A method according to claim 27 wherein said graphic user interface elements provide information regarding at least one device selected from the group consisting of speedometer, tachometer, audio equipment, air conditioner, Internet browser, television, GPS, sun roof, windows, seat positioning, cellular telephone, fuel gauge, oil level gauge, tire pressure gauge, engine temperature gauge, brake temperature gauge, window-washer fluid gauge and headlights.

29. A method according to claim 27 wherein modifying the graphic composition of the display comprises adding a graphic user interface elements to the dashboard display.

30. A method according to claim 27 wherein modifying the graphic composition of the display comprises removing a graphic user interface elements from the dashboard display.

31. One of the method according to claim 27 wherein modifying the graphic composition of the display comprises changing the position of a graphic user interface element on the dashboard display.

32. One of the method according to claim 27 wherein modifying the graphic composition of the display comprises changing the size of a graphic user interface element on the dashboard display.

33. A method according to claim 27 further comprising modifying the graphic composition of the display responsive to a control signal input by a driver of the vehicle.

34. A method according to claim 33 wherein said control signal comprises a vocal input.

35. A method according to claim 33 wherein inputting said control signal comprises selecting an image, icon or button on the dashboard display, or selecting an item from a pull-down menu on the dashboard display.

36. A method according to claim 33 wherein inputting said control signal comprises manipulating a selecting device mounted upon steering apparatus of the vehicle.

37. A method according to claim 36 wherein said selecting device comprises a pointing device.

38. A method according to claim 37 wherein said pointing device is selected from the group consisting of a joystick, a thumb-button, track-point, and pressure sensitive hand-grips.

39. A method according to claim 37 wherein said selecting device also comprises clickable buttons located upon said steering apparatus.

40. A method according to claim 37 wherein said selecting device also comprises clickable buttons located upon said pointing device.

41. A method according to claim 36 wherein inputting said control signal does not require the driver removing a hand from the steering apparatus.

42. A method according to claim 33 wherein said control signal is selected from the group consisting of a request to initiate a telephone call, a request to change the internal temperature of the vehicle, a request to utilize the GPA, a request to adjust the audio equipment.

43. A method according to claim 27 wherein displaying the graphic user interface elements comprises personally configuring the dashboard display for an individual driver.

44. A method according to claim 43 wherein personally configuring comprises configuring the graphic user interface elements responsive to an input of driver preferences regarding the graphic composition of the dashboard display.

45. A method according to claim 43 wherein personally configuring comprises configuring the graphic user interface elements responsive to an input of driver preferences relating to operation of the dashboard display.

46. A method according to claim 43 wherein personally configuring comprises configuring the graphic user interface elements responsive to an input of driver preferences relating to operation of at least one device in the vehicle.

47. A method according to claim 43 wherein said inputting driver preferences occurs at a remote location from the vehicle.

48. A display system according to claim 43 wherein said input of driver preferences occurs within the vehicle.

49. A method according to claim 48 wherein said input of driver preferences occurs while driving.

50. A method for displaying information regarding operation of in-vehicle devices, comprising:
receiving signals from the devices;
displaying graphic user interface elements in a predetermined graphic composition on a dashboard display positioned in front of a driver of the vehicle, so as to provide information to a driver of the vehicle regarding operation of devices; and
modifying the graphic composition of the display responsive to a selected event associated with the vehicle,
wherein displaying the graphic user interface elements comprises personally configuring the dashboard display for an individual driver, and
wherein said input of driver preferences occurs within the vehicle, and
wherein personally configuring comprises learning driver preferences while driving.

* * * * *